United States Patent
Khoryaev et al.

(10) Patent No.: US 9,491,725 B2
(45) Date of Patent: Nov. 8, 2016

(54) USER EQUIPMENT AND METHODS FOR DEVICE-TO-DEVICE COMMUNICATION OVER AN LTE AIR INTERFACE

(71) Applicant: Intel Corporation, Santa Clara, CA (US)

(72) Inventors: Alexey Vladimirovich Khoryaev, Nizhny Novgorod (RU); Sergey Panteleev, Nizhny Novgorod (RU); Sergey Sosnin, Zavolzhie (RU); Debdeep Chatterjee, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 14/493,030

(22) Filed: Sep. 22, 2014

(65) Prior Publication Data

US 2015/0215882 A1    Jul. 30, 2015

Related U.S. Application Data

(60) Provisional application No. 61/933,870, filed on Jan. 30, 2014.

(51) Int. Cl.
| | |
|---|---|
| *H04W 4/00* | (2009.01) |
| *H04W 56/00* | (2009.01) |
| *H04W 72/04* | (2009.01) |
| *H04W 84/18* | (2009.01) |

(52) U.S. Cl.
CPC ....... *H04W 56/001* (2013.01); *H04W 72/0446* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2011/0243010 | A1* | 10/2011 | Geirhofer | H04W 52/08 370/252 |
| 2011/0255450 | A1* | 10/2011 | Wang | H04W 72/0493 370/280 |
| 2012/0093098 | A1* | 4/2012 | Charbit | H04W 72/04 370/329 |
| 2013/0142268 | A1* | 6/2013 | Gao | H04W 72/04 375/252 |
| 2013/0322413 | A1* | 12/2013 | Pelletier | H04W 72/1289 370/336 |
| 2014/0321360 | A1* | 10/2014 | Han | H04W 36/0066 370/328 |
| 2015/0055567 | A1* | 2/2015 | Narasimha | H04W 76/023 370/329 |
| 2015/0181546 | A1* | 6/2015 | Freda | H04W 56/0015 370/336 |
| 2015/0351059 | A1* | 12/2015 | Seo | H04W 56/002 370/350 |

* cited by examiner

*Primary Examiner* — Bob Phunkulh
(74) *Attorney, Agent, or Firm* — Schwegman Lundberg & Woessner, P.A.

(57) ABSTRACT

Embodiments of a UE to operate in accordance with a device-to-device (D2D) communication mode are disclosed herein. The UE may include hardware processing circuitry to determine a synchronization reference time based on reception of signals from an eNB. The hardware processing circuitry may be further to, during a D2D communication session, transmit Multi-Time Transmission Interval Bundle Groups (MTBG) of data symbols during a first group of Data Transmission Intervals (DTI) and refrain from transmission of data symbols during a second group of DTIs. Starting times of the DTIs may be based at least partly on the synchronization reference time. The hardware processing circuitry may be further to transmit, during an in-network communication session, data symbols according to a Time Transmission Interval (TTI) reference time synchronized to the synchronization reference time.

21 Claims, 8 Drawing Sheets

USER EQUIPMENT AND METHODS FOR DEVICE-TO-DEVICE COMMUNICATION OVER AN LTE AIR INTERFACE

PRIORITY CLAIM

This application claims priority under 35 USC 119(e) to U.S. Provisional Patent Application Ser. No. 61/933,870 filed Jan. 30, 2014 [reference number P63780Z (884.R09PRV)], which is incorporated herein by reference in its entirety.

TECHNICAL FIELD

Embodiments pertain to wireless communications. Some embodiments relate to cellular communication networks including LTE networks. Some embodiments relate to device-to-device (D2D) communication. Some embodiments relate to Voice Over Internet Protocol (VoIP).

BACKGROUND

A mobile device may exchange voice, data or other signals or information with other devices through communication sessions that involve network components, such as base stations. For instance, a first mobile device may transmit signals or information to a base station for forwarding to a second mobile device through a network. The second mobile device may actually be in close proximity to the first mobile device in some cases, although communication between the two devices may still take place through the network.

A mobile device operating in a cellular network may experience degradation in performance or user experience when the network becomes highly loaded with devices or traffic. The mobile device may also experience performance degradation, or even a loss of connectivity, when moving toward or beyond coverage boundaries of the network. Direct communication between mobile devices may alleviate these and other challenges, and therefore there is a need for such methods and techniques.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
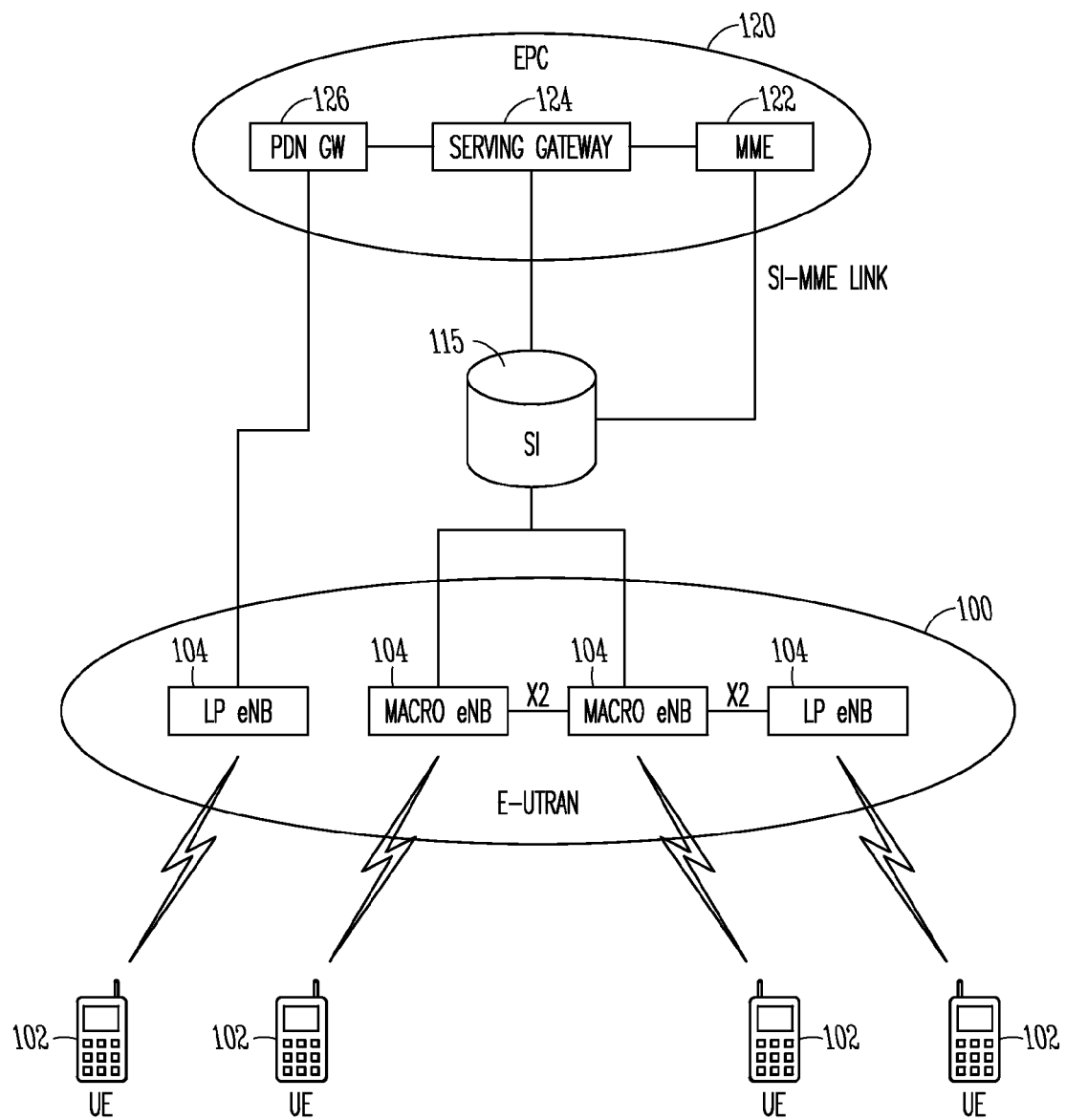
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

In accordance with some embodiments, a UE 102 may be configured to determine a synchronization reference time based on reception of one or more signals from an eNB 104. A UE 102 may also be configured to support device-to-device (D2D) communication with other UEs using OFDMA, SC-FDMA or other multiple access schemes, and the D2D communication may utilize the synchronization reference time in some cases. These embodiments are described in more detail below.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
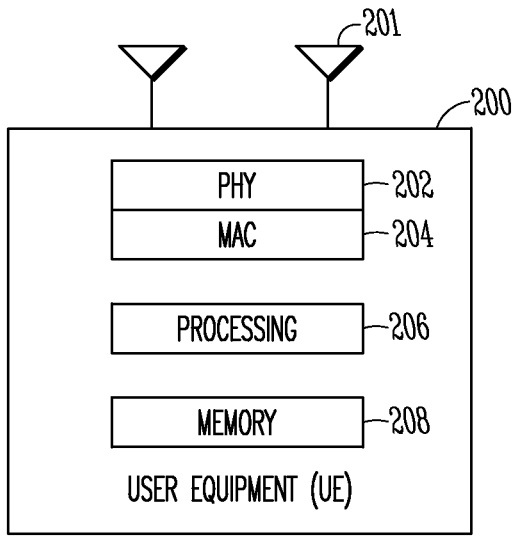
FIG. 2 is a functional diagram of a User Equipment (UE) in accordance with some embodiments.
Figure 3:
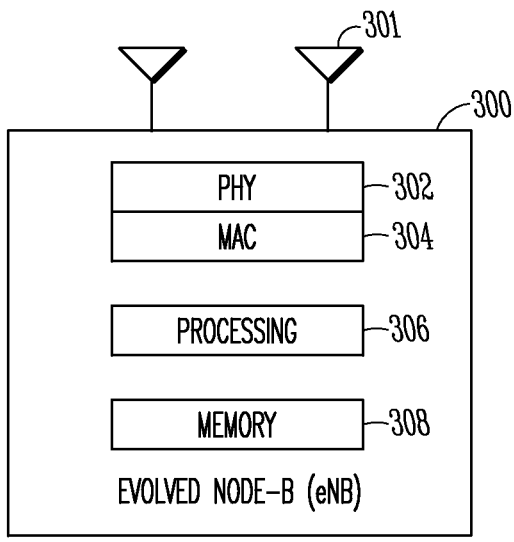
FIG. 3 is a functional diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 102 may operate in accordance with a device-to-device (D2D) communication mode. The UE may include hardware processing circuitry to determine a synchronization reference time based on reception of one or more signals from the eNB 104. The hardware processing circuitry may be further to, during a D2D communication session, transmit Multi-Time Transmission Interval Bundle Groups (MTBG) of data symbols during a first group of Data Transmission Intervals (DTI) and refrain from transmission of data symbols during a second group of DTIs that is exclusive to the first group of DTIs. Starting times of the DTIs may be based at least partly on the synchronization reference time. The hardware processing circuitry may be further to transmit, during an in-network communication session exclusive to the D2D communication session, data symbols according to a Time Transmission Interval (TTI) reference time that is synchronized to the synchronization reference time. These embodiments are described in more detail below.

In some scenarios, the UE 102 operating in a cellular communication network may begin to experience performance degradation for various reasons. As an example, user loading or throughput demands of the network may become high. As another example, the UE 102 may move toward or beyond the edges of coverage cells. While operating in the network, the UE 102 may actually be in communication with other UEs that are physically located in close proximity to the UE 102, although the communication may take place through the network. In addition to, or instead of, communication through the network, it may be beneficial to the UE 102 and the system for the UE 102 to engage in direct or device-to-device (D2D) communication with one or more other UEs that may be within range of the UE 102. As an example, in the performance degradation scenarios described above, the D2D communication between the UE 102 and the other UEs may enable the network to off-load some of the network traffic, which may improve overall system performance.

Figure 4:
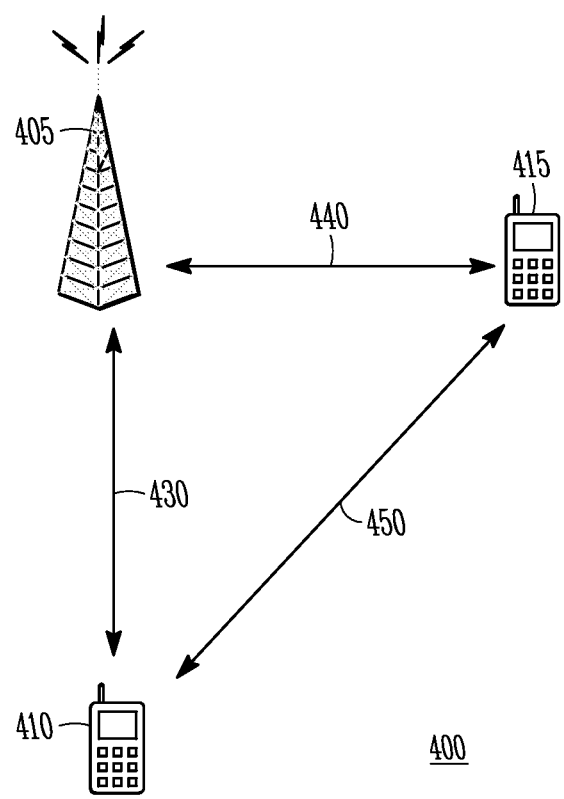
FIG. 4 is an example of a scenario in which UEs may be in communication with an eNB and with each other in accordance with some embodiments.

Referring to FIG. 4, an example scenario 400 shows an eNB 405 that may be in communication with one or more UEs 410, 415 as part of in-network communication sessions over the links 430 and 440, respectively. The eNB 405 may be an eNB 104 while the UEs 410, 415 may be UEs 102, and the in-network communication sessions may take place over a network such as 100. Techniques and scenarios discussed are not limited to the number or types of eNBs and UEs shown in the example scenario 400, as any suitable number or types may be used. For instance, the eNB 405 is not limited to the tower configuration shown.

In addition to the in-network communication sessions that may be supported by the UEs 410, 415, direct connections between the UEs 410, 415 or other UEs may also be supported. Such communication may be referred to as device-to-device (D2D) communication. For instance, a D2D communication session between the UEs 410, 415 may take place over the link 450. In some cases, in-network and D2D communication sessions may take place simultaneously, but may occur exclusively in other cases.

Figure 5:
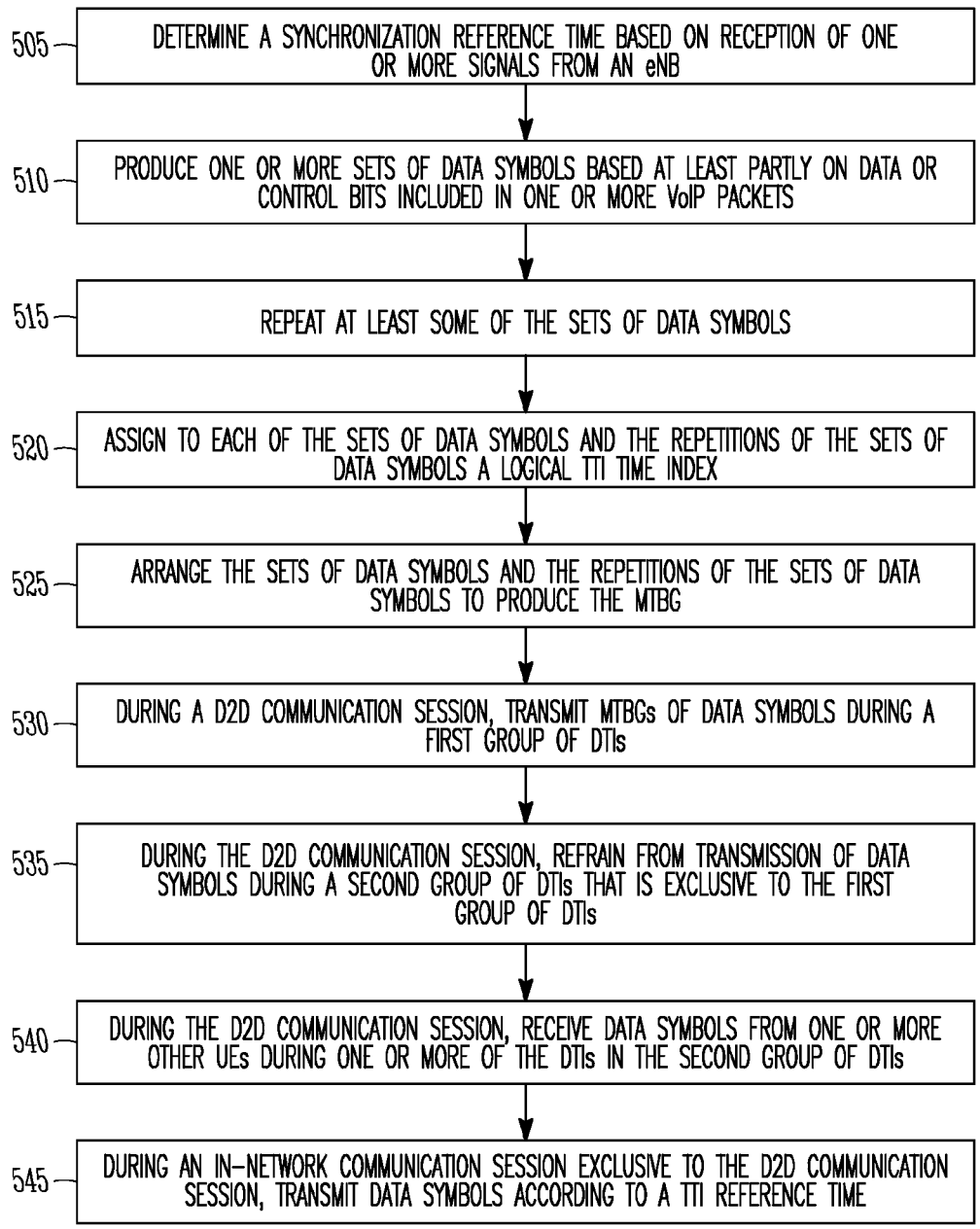
FIG. 5 illustrates the operation of a method of device-to-device (D2D) communication at a UE in accordance with some embodiments.

Referring to FIG. 5, a method 500 of operating in accordance with a D2D communication mode is shown. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-9, although it is understood that the method 500 may be practiced with any other suitable systems, interfaces and components. For example, reference may be made to the scenario 400 in FIG. 4 described earlier for illustrative purposes, but the techniques and operations of the method 500 are not so limited.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, a synchronization reference time based on reception at the UE 102 of one or more signals from the eNB 104 may be determined. In some embodiments, the reception of the signals from the eNB 104 may occur at least partly during an in-network communication session between the UE 102 and the eNB 104. As an example, before establishing a D2D communication session with another UE, the UE 102 and the other UE may synchronize to a reference time of the network in order to facilitate the operation of the D2D communication session. As another example, during the D2D communication session, the UE 102 may synchronize or resynchronize to a reference time of the network, or may refine or adjust a previously acquired reference time.

In some embodiments, the in-network communication session may be exclusive to D2D communication sessions supported by the UE 102. However, these embodiments are not limiting, as in-network communication and D2D communication sessions may be supported simultaneously or together in some embodiments. As an example, the in-network communication session may utilize a first group of one or more frequency bands (such as one each for uplink and downlink) while the D2D communication session may utilize a second, different frequency band or bands. In such an arrangement, it may be possible or permitted that the UE 102 transmit or receive simultaneously in both communication sessions.

Accordingly, the eNB 104 may be part of the network 100, and the synchronization reference time may be related to one or more reference times of the network 100. As an example, the synchronization reference time may be related to a "master clock" or a "time zero" or other reference time or other time associated with the network 100. The UE 102 or eNB 104 may use the synchronization reference time to determine when (or approximately when) a frame, symbol period, slot or other time period or unit may start, finish or occur. The determination may be performed at the UE 102 during reception of one or more signals from the eNB 104 (or other eNBs) by applying an auto-correlation, cross-correlation or other suitable techniques to the received signals. In addition, the received signals may also contain information or control bits that may be used (after decoding) in the determination of the reference synchronization time. As an example, the UE 102 may determine a system frame number (SFN) from decoded bits and determination of the reference synchronization time may be based at least partly on the SFN. As another example, the UE 102 may decode one or more control messages that include information about a higher-level master time, which may be used as part of the determination of the reference synchronization time. In some embodiments, the reference time may be given respect to a global time, such as GMT. It should be noted that although reference may be made to the network 100, it is understood that techniques and operations described are not limited to the network 100, and may be applied to other networks.

At operation 510, one or more sets of data symbols may be produced based at least partly on data or control bits included in one or more VoIP packets. In some embodiments, for each of multiple VoIP packets, a set of data symbols based at least partly on data or control bits included in the VoIP packet may be produced. As an example, the data or control bits may be input to operations such as forward error correction (FEC), cyclic redundancy check (CRC), interleaving, and bit-to-symbol mapping as part of producing the set of data symbols. In some embodiments, a set of data symbols may be transmittable or for transmission using at least a portion of system frequency resources during a single Time Transmission Interval (TTI), as will be explained later. As an example, the set of data symbols may be transmitted as part of an OFDM signal and may include modulated symbol points (from a constellation) that may be mapped into a time-frequency grid that spans a TTI in time duration. As another example, the set of data symbols may include modulated symbol points from a DFT pre-coded modulation sequence (SC-FDM waveform). These embodiments are not limiting, however, as the set of data symbols may be transmittable or for transmission during multiple TTIs and may be mapped into a time-frequency grid that spans multiple TTIs for transmission as part of an OFDM signal in some embodiments.

Figure 6:
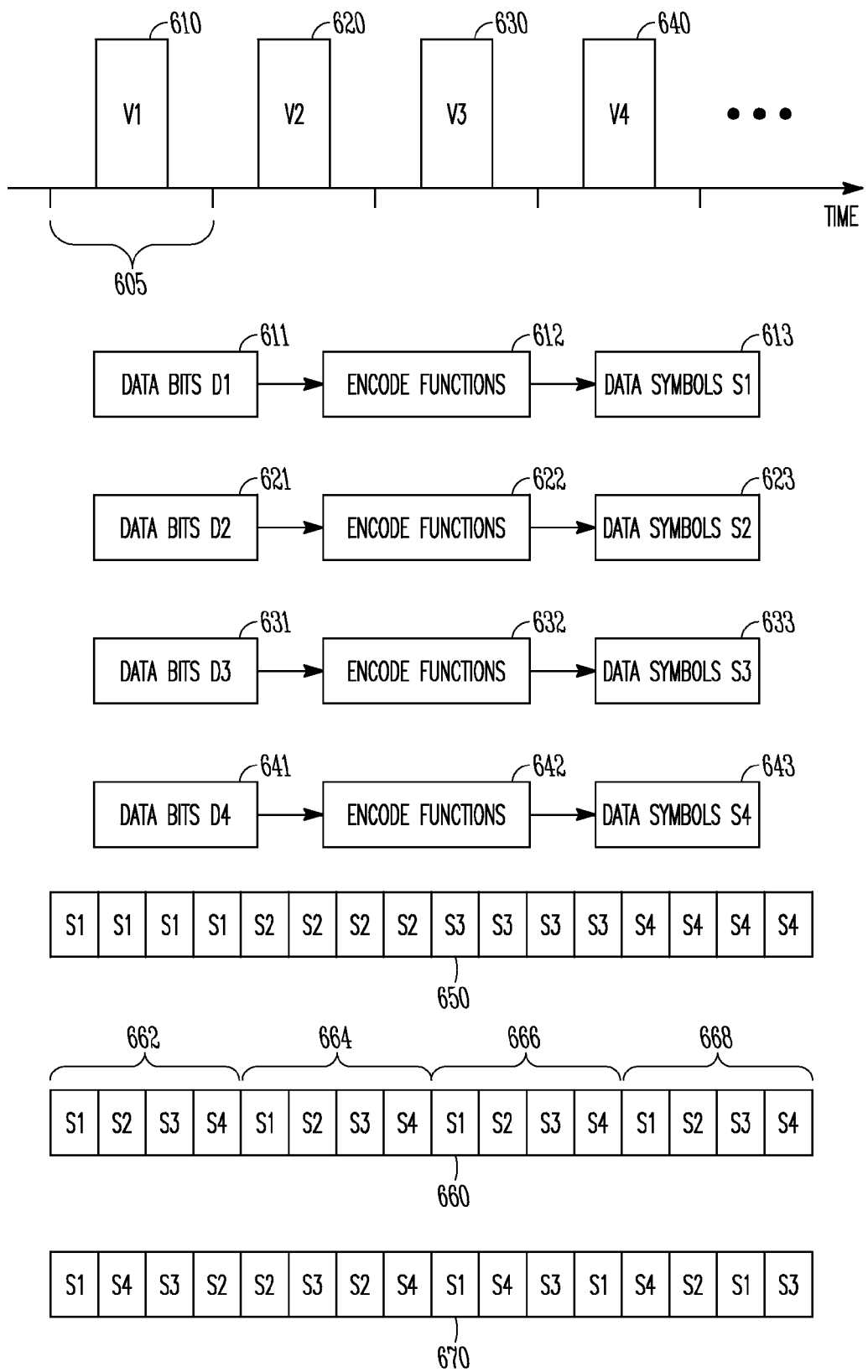
FIG. 6 illustrates examples of producing Multi-Time Transmission Interval Bundle Groups (MTBGs) in accordance with some embodiments.

Referring to FIG. 6, an example of producing sets of data symbols based on data or control bits included in multiple VoIP packets is shown. A first VoIP packet 610 (labeled "V1") may be available for processing or produced by a vocoder or VoIP function during a first VoIP time interval 605, which may be of any suitable duration that may or may not be related to the TTI or Data Transmission Interval (DTI), which will be explained later. As a non-limiting example, in some cases the VoIP time interval may be of duration 20 msec, but is not limited as such, and may be 5, 10, 30 msec or any suitable duration. Accordingly, for a duration of 20 msec, a VoIP packet (like 610) may be available for processing every 20 msec or produced by a vocoder or VoIP function every 20 msec.

The first VoIP packet 610 may include first data bits 611 (labeled "D1"), which may be input to one or more encoding functions 612 to produce a first set of data symbols 613 (labeled "S1"). The encoding functions 612 may include operations such as FEC, CRC, interleaving, bit-to-symbol mapping or other suitable functions. Similarly, second, third, and fourth VoIP packets 620, 630, 640 (labeled "V2," "V3," and "V4") respectively may include data bits 621, 631, 641 (labeled "D2," "D3," and "D4"), which may be input to one or more encoding functions 622, 632, 642 to produce second, third, and fourth sets of data symbols 623, 633, 643 (labeled "S2," "S3," and "S4") as shown in FIG. 6. It should be noted that embodiments are not limited to the number of VoIP packets shown in the example of FIG. 6. In addition, the example shows encoding operations on data bits only for ease of illustration, but this is not limiting. In some embodiments, control or other bits may be used in addition to, or instead of, the data bits.

In some embodiments, one or more sets of data symbols may be produced based at least partly on a combination (such as concatenation) of data or control bits included in multiple VoIP packets. For instance, data bits from multiple VoIP packets may be concatenated into a single block of data bits for input to operations such as FEC, CRC, interleaving, and bit-to-symbol mapping as part of producing the one or more sets of data symbols. As previously described, the sets of data symbols may be transmittable or for transmission during a single TTI or during multiple TTIs using at least a portion of system frequency resources, which may be mapped into a time-frequency grid for transmission as part of an OFDM signal in some embodiments.

Figure 7:
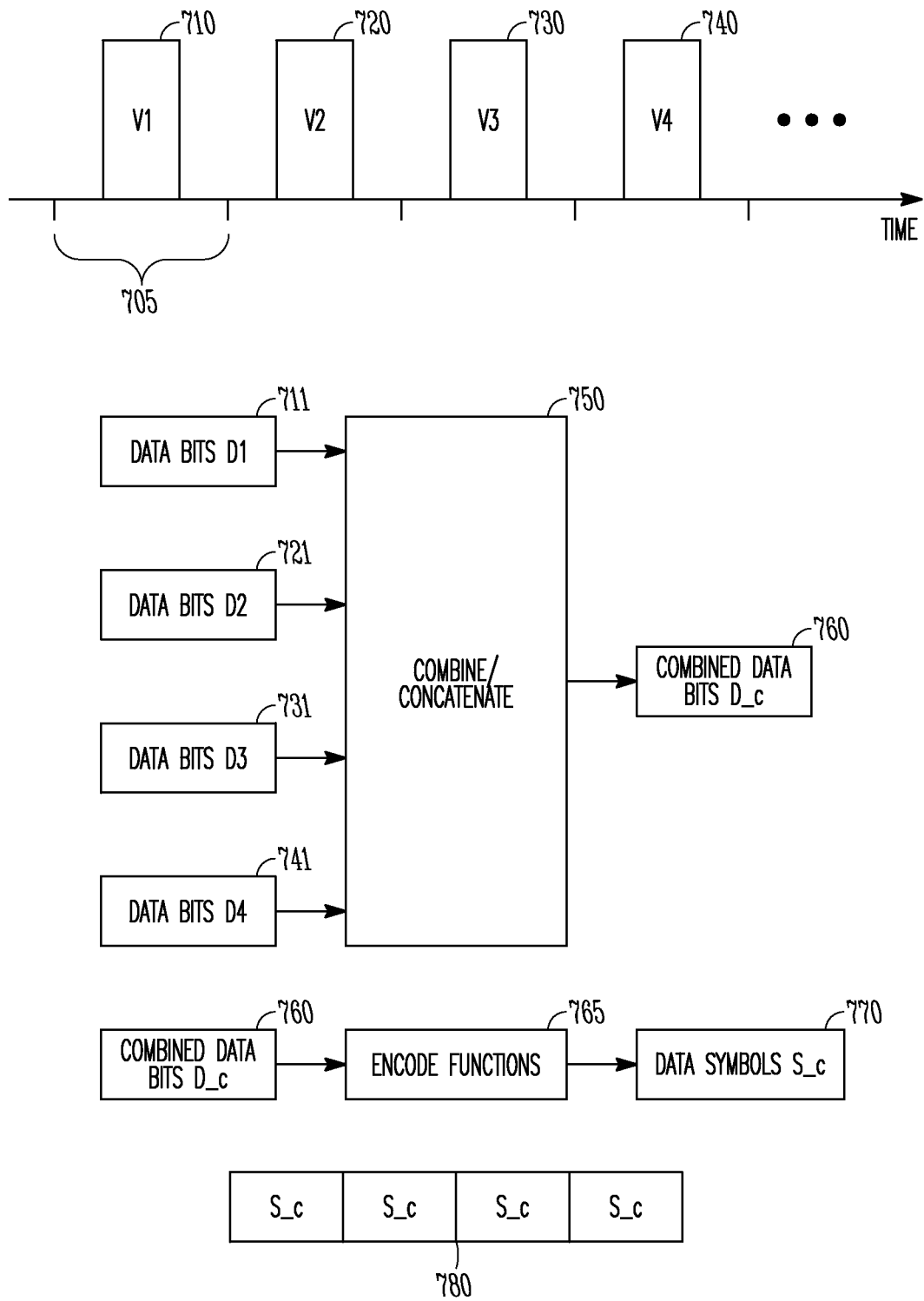
FIG. 7 illustrates another example of producing MTBGs in accordance with some embodiments.

Referring to FIG. 7, another example of producing sets of data symbols based on data or control bits included in multiple VoIP packets is shown. As previously described, VoIP packets may be available for processing or produced by a vocoder or VoIP function during VoIP time intervals that may or may not be related to the TTI or DTI. A first VoIP packet 710 (labeled "V1") from the first VoIP time interval 705 may include first data bits 711 (labeled "D1"), while second, third, and fourth VoIP packets 720, 730, 740 (labeled "V1," "V2," and "V3") may include second, third, and fourth data bits 721, 731, 741 (labeled "D1," "D2," and "D3"). The four sets of data bits 711, 721, 731, 741 may be input to a combine/concatenate function 750 to produce a combined block of data bits 760, which may be input to encoding functions 765 to produce an output set of data symbols 770. The combine/concatenate function 750 may concatenate the four sets of data bits 711, 721, 731, 741 or may perform any other suitable combining function, which may include scrambling, puncturing or other function. The encoding functions 765 may include operations such as FEC, CRC, interleaving, bit-to-symbol mapping or other suitable functions. It should be noted that embodiments are not limited to the number of VoIP packets shown in the example of FIG. 7. In addition, the example shows operations on data bits only for ease of illustration, but this is not limiting. In some embodiments, control or other bits may be used in addition to, or instead of, the data bits.

Returning to the method 500, at operation 515, at least some of the sets of data symbols may be repeated, which may be performed in order to enable a possibility of a diversity gain at a receiving UE. At operation 520, each of the sets of data symbols and the repetitions of the sets of data symbols may be assigned a logical TTI time index. The sets of data symbols and the repetitions of the sets of data symbols may be arranged to produce an MTBG at operation 525. In some embodiments, the arrangement may be performed according to a mapping between the assigned logical TTI time indexes and a set of physical TTI time indexes. Accordingly, the MTBG may be specified by a set of physical TTI time indexes that refer to times (or time indexes) for transmission of the sets of data symbols according to the TTI. In some embodiments, operations 520 and 525 may enable time interleaving of the sets of data symbols, which may enable a possible time diversity gain at a receiving UE.

In some embodiments, the mapping between the logical and physical TTI time indexes may be a predefined mapping function that may enable randomization of the physical TTI time indexes, which may enable a possible time diversity gain at a receiving UE. In some embodiments, the predefined mapping function may enable orthogonalization of the physical TTI time indexes for transmission by the UE 102 with second, different physical TTI time indexes. As an example, the second physical TTI time indexes may be used by other UEs for transmission as part of D2D or in-network communication sessions. As a result of the orthogonalization, transmissions by the UE 102 and the other UEs may be performed on different physical TTI time indexes, which may reduce or alleviate interference between the UE 102 and other UEs.

Referring back to the example shown in FIG. 6, the sets of data symbols 613, 623, 633, 643 (S1-S4) and repetitions of them may be arranged in various ways to form an MTBG for transmission during a DTI. As an example, the MTBG 650 may be formed by arranging four repetitions of each of S1-S4 in the order shown. That is, the four copies of S1 may occupy the first four TTIs of the MTBG 650 and the four copies of S2 may occupy the next four TTIs of the MTBG 650. The four copies of S3 and S4 may follow in similar fashion. It should be noted that the number of repetitions is not limited to four, and can be any suitable number. In addition, embodiments are not limited to repetition of each of the sets of data symbols (such as S1-S4) by the same number of times. As an example, an MTBG may include four repetitions of S1 and only three repetitions of S2.

As another example, the MTBG 660 may be formed by arranging the four repetitions in an interlaced configuration as shown. That is, a copy of each set of data symbols S1-S4 may occupy the first group of four TTIs (662) in that same order (1-4). The second, third, and fourth groups of TTIs (664, 666, 668) may also be occupied by a copy of each set of data symbols S1-S4. Although each group of four TTIs 662-668 is shown as being occupied by S1-S4 in the same order, this configuration is not limiting, and each group 662-668 may include S1-S4 in different orders in some embodiments.

As another example, the MTBG 670 may be formed by repeating each set of data symbols S1-S4 to produce four repetitions, and subsequently arranging the sets of data symbols and the repetitions according to a mapping or pattern. In some embodiments, the pattern may be a pseudo-random pattern, a scrambling pattern, a pre-defined pattern, a pattern designed according to performance simulations or any suitable pattern that maps logical TTI time indexes to physical TTI time indexes. Accordingly, in this example, the four repetitions of S1-S4 as arranged in the MTBG 650 may be assigned a logical TTI time index on 1-16, which may be mapped to the set of physical TTI time indexes {1, 9, 12, 15, 4, 5, 7, 14, 3, 6, 11, 16, 2, 8, 10, 13} to produce the MTBG 670. That is, the MTBG 650 may be processed by a logical-to-physical mapping to produce the MTBG 670. The sets of data symbols included in the MTBG 770 may be transmittable in the order shown according to the TTI. It should be noted that the mappings shown and the number of repetitions illustrate the concepts, but are not limiting. Other mappings may be used and the number of repetitions may be different from what is shown, and the number of repetitions may be different for each of the sets of data symbols S1-S4 in some embodiments.

As another example of forming an MTBG, the MTBG 780 (shown in FIG. 7) may be formed by concatenating four repetitions of the output set of data symbols 770 as shown. This arrangement is not limiting, however, and an MTBG may be formed using any number of repetitions of the data symbols 770. In addition, other sets of symbols, such as one or more scrambled or punctured versions of the data symbols 770, may be used in forming an MTBG.

It should be noted that an MTBG may include data or control bits or symbols in addition to those previously described. As an example, additional data or control symbols may occupy one or more TTIs of an MTBG. As another example, symbols such as pilots may be inserted into sets of data symbols previously described. As another example, some or all of the sets of data symbols may be mapped according to a logical-to-physical mapping between symbol locations within the set and REs for transmission. Accordingly, an MTBG may be based at least partly on multiple VoIP packets, and may be further based on other bits or symbols.

In some embodiments, an MTBG may include single or multiple data packets that may be MAC Protocol Data Units (PDUs). Transmission of the MTBG may include transmission of different redundancy versions of the packets or retransmission of the packets during a number of TTIs or DTIs. The DTI may designate a time interval in which the UE 102 may transmit packets of the MTBG according to the TTI as part of D2D communication.

Returning to the method 500, at operation 530 during a D2D communication session, MTBGs of data symbols may be transmitted during a first group of DTIs. At operation 535, during the D2D communication session, transmission of data symbols may be refrained from during a second group of DTIs that is exclusive to the first group of DTIs. Data symbols may be received from one or more other UEs during one or more of the DTIs in the second group of DTIs during the D2D communication session at operation 540.

In some embodiments, the DTIs may be of a uniform window size that spans multiple TTIs. As an example, the TTI may be one msec in duration and the DTI may be 20 msec in duration, in which case the DTI may include 20 TTIs. In some embodiments, the DTI can span 40, 80, 120, 160 msec or any other suitable duration. Transmission of the MTBG (or reception) during a DTI or other time window that may be large in comparison to the TTI may serve to restrict the UE 102 from switching back and forth between transmit and receive too frequently, which may provide performance benefits in terms of AGC settling or other effects. In some embodiments, the starting times of the DTIs may be spaced apart by an integer multiple of the window size. In addition, the starting times of the DTIs may be based at least partly on the synchronization reference time.

In some embodiments, the transmission of the MTBGs during the first group of DTIs may be for reception at one or more other UEs, and may occur over a direct connection with the other UEs as part of the D2D communication session. It may be intended that the UE 102 transmit the MTBGs for reception at the other UEs according to the synchronization reference time. That is, it may be assumed, in some cases, that the UE 102 and the other UEs are synchronized (at least roughly) to the synchronization reference time as described earlier.

In some embodiments, an MTBG may be transmitted by the UE 102 during each DTI of the first group of DTIs. In some embodiments, the DTIs of the first group of DTIs may simply be available for transmission of MTBGs by the UE 102, although the UE 102 may or may not actually transmit an MTBG during every DTI of the first group. For instance, the traffic for transmission by the UE 102 may be intermittent or the communication between the UE 102 and other UEs may be half-duplex. In such cases, it is possible that during some of the DTIs, the UE 102 may not have any data for transmission. In some embodiments, transmission of the MTBGs the first group of DTIs may be restricted to transmission of one or fewer MTBGs during each DTI. For instance, the UE 102 may not have an MTBG to transmit during some of the DTIs, as previously mentioned.

Figure 8:
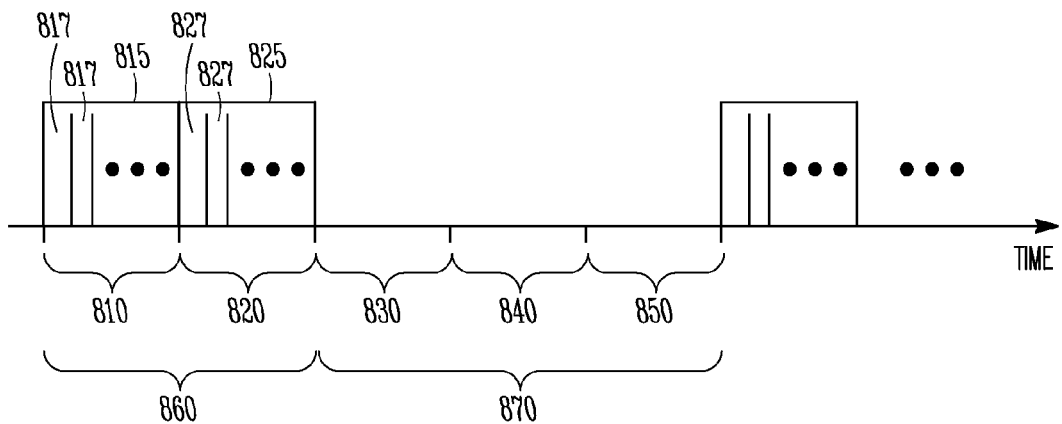
FIG. 8 illustrates an example of D2D communication according to a Data Transmission Interval (DTI) in accordance with some embodiments.

Referring to FIG. 8, a non-limiting example of MTBG transmission according to DTIs is shown. During a first DTI 810, the MTBG 815 may be transmitted. It should be noted that the DTI 810 may include multiple TTIs 817, which may include one or more sets of data symbols as previously described. A second DTI 820 may include multiple TTIs 827, and the MTBG 825 may be transmitted during the DTI 820. As such, the DTIs 810 and 820 may form, or may be included in, a first group of DTIs 860 in which MTBGs 815, 825 are transmitted. In this example, MTBGs are not transmitted during the DTIs 830, 840, 850, which may form, or be included in, a second group of DTIs 870 in which the UE 102 refrains from transmission of MTBGs. This example is used to illustrate concepts, but is not limiting. In some embodiments, the first or second groups of DTIs may or may not be contiguous groups of DTIs. In some embodiments, the first or second groups of DTIs may include more DTIs than what is shown. In some embodiments, the first and second groups of DTIs may be configured according to periodicity. For instance, in the example of FIG. 8, the group of five DTIs formed by concatenation of the first group 860 and the second group 870 may be repeated. In such an arrangement, DTIs available for transmission may occupy the first and second DTIs of each repeated window of five DTIs. Accordingly, the combination of the first and second DTIs of multiple windows of five DTIs may actually be considered as the first group. Similarly, the DTIs in which transmission is refrained from may occupy the third, fourth, and fifth DTIs of each repeated window of five DTIs. Accordingly, the combination of the third, fourth, and fifth DTIs of multiple windows of five DTIs may actually be considered as the second group.

In some embodiments, transmission during a first group of DTIs may also be restricted in frequency such that the transmission occupies a portion of the available frequency resources, which may be a contiguous portion. The frequency resources for the transmission may span any appropriate range in frequency, such as a D2D frequency block. The D2D frequency block may span one, two or any number of Resource Blocks (RBs) or any number of Resource Elements (REs). In some embodiments, the D2D frequency block may be contiguous. In addition, the D2D frequency block may be of any suitable size in frequency, and may be included in a standard such as 3GPP or others. The frequency resources for the transmission may also span any suitable number of Resource Elements (REs) or other frequency unit or range. These embodiments are not limiting, however, as the frequency resources for transmission may span the entire range of available frequency resources or a non-contiguous portion of them.

Figure 9:
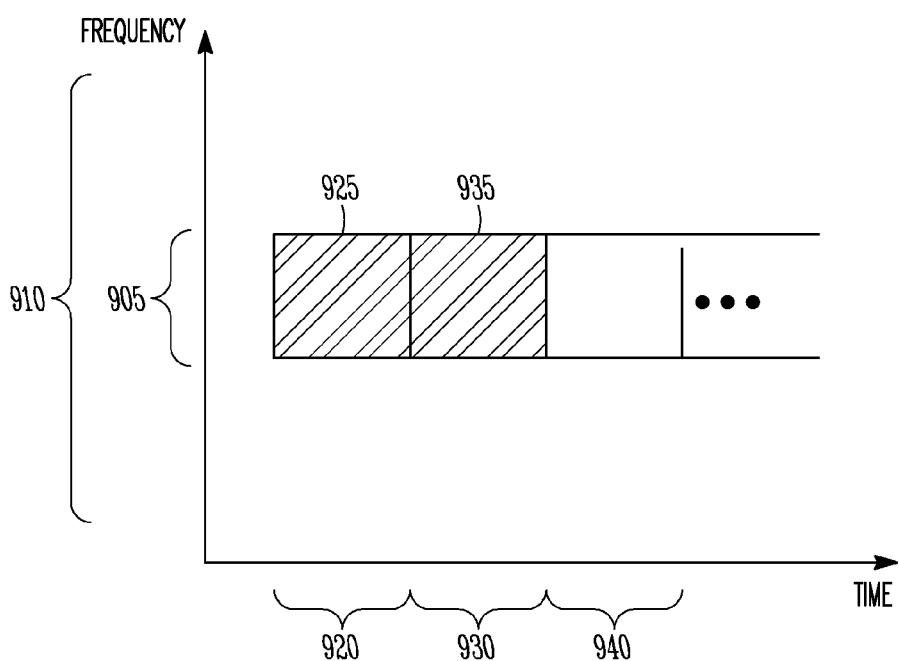
FIG. 9 illustrates another example of D2D communication according to a Data Transmission Interval (DTI) in accordance with some embodiments.

Referring to the example in FIG. 9, the MTBG 925 may be transmitted during the DTI 920, while the MTBG 935 may be transmitted during the DTI 930. Transmission of MTBGs may be refrained from or restricted during the DTI 940. The transmission of the MTBGs 925, 935 may be restricted to the frequency resources 905, which may be a portion of the frequency range 910 available for D2D or other communication. Accordingly, it is possible that frequency resources that are included in the frequency range 910, but exclusive to the frequency resources 905, may be available to other UEs for communication, including D2D communication.

The frequency range 905 for transmission by the UE 102 as part of a D2D communication session is shown as a contiguous range, but this is not limiting. In some embodiments, frequency hopping may be employed. As an example, during each DTI 920, 930, 940 or others, transmission may take place on a different range of frequencies, in which case the hopping interval may be the same as the DTI. As another example, frequency hopping may occur at a granularity smaller than or greater than a DTI. For instance, the hopping interval may be a fraction of a DTI, multiple DTIs, multiple or a single TTI or any suitable time interval. As such, an MTBG transmitted during a DTI may be transmitted on a group of TTIs according to a frequency hopping pattern. The granularity of the hopping in frequency can be any suitable range, including one, two, or more RBs. The hopping pattern may be a pseudo-random or other pattern, which may be determined as part of performance analysis or simulation. In some embodiments, Physical Uplink Shared Channel (PUSCH) hopping that may be used for uplink communication with an eNB may be used for D2D communication or modified for use in D2D communication. As an example, the PUSCH hopping may include Type-1 or Type-2 hopping included in 3GPP or other standards.

At operation 545, data symbols may be transmitted at the UE 102 during an in-network communication session, and the transmission may be for reception at the eNB 104. The transmission may be performed according to a TTI reference time synchronized to the synchronization reference time described earlier. As an example, the UE 102 may transmit or receive on TTI boundaries during the in-network communication session, and may be restricted to transmit or receive on DTI boundaries during D2D communication sessions. In addition, the DTI starting times may be aligned with the synchronization reference time such that a DTI includes an integer number of TTIs, and the starting time of a first TTI in a DTI is aligned with the starting time of the DTI.

Accordingly, the UE 102 may be able to transmit and/or receive in a less restrictive manner during the in-network communication session in comparison to a D2D communication session. As an example, a time duration that spans a DTI may include a first, second, and third TTI ordered in time such that the third TTI is later than the second TTI and the second TTI is later than the first TTI. During the in-network communication session, the UE 102 may transmit data symbols during the first TTI, receive data symbols during the second TTI, and transmit symbols during the third TTI, with transmission and reception possibly performed in different frequency bands. In contrast, the UE 102 may be restricted from performing both transmission and reception of data symbols during the DTI when operating in a D2D communication session.

In some embodiments, the D2D communication session may be performed in a half-duplex mode in which the UE 102 and other UEs can either transmit or receive during a DTI, but are restricted from doing both during the DTI. In some embodiments, the in-network communication session may be half-duplex. In some embodiments, the in-network communication session may be full-duplex, and the UE 102 may transmit and receive during a TTI or DTI or other time interval. For instance, the UE 102 may operate according to a frequency-division duplexing (FDD) arrangement in which transmission to the eNB 104 (uplink) is performed in a first frequency band while reception from the eNB 104 (downlink) is performed in a second, different frequency band.

It should be noted that during D2D communication sessions, MTBGs may be transmitted as part of one or more Orthogonal Frequency Division Multiplexing (OFDM) signals. In some embodiments, the sets of data symbols in the MTBGs, as previously described, may be mapped to Resource Elements (REs) and OFDM symbol periods of the OFDM signals. In some embodiments, DFT pre-coded data symbols in the MTBGs may be mapped to Resource Elements (REs) and OFDM symbol periods of the OFDM signals. As previously mentioned, the MTBGs may include additional symbols such as pilots, which may be inserted on the appropriate REs of OFDM symbols. One or more OFDM symbol periods, and cyclic prefixes if appropriate, may be included in a TTI. Similarly, the data symbols transmitted during the in-network communication sessions according to a TTI may also be transmitted as part of such OFDM signals. In some embodiments, physical layer protocols or specifications used by the UE 102 for operation in D2D and in-network communication sessions may be similar or the same. For instance, transmission during both modes may be performed according to an LTE physical layer protocol.

Figure 10:
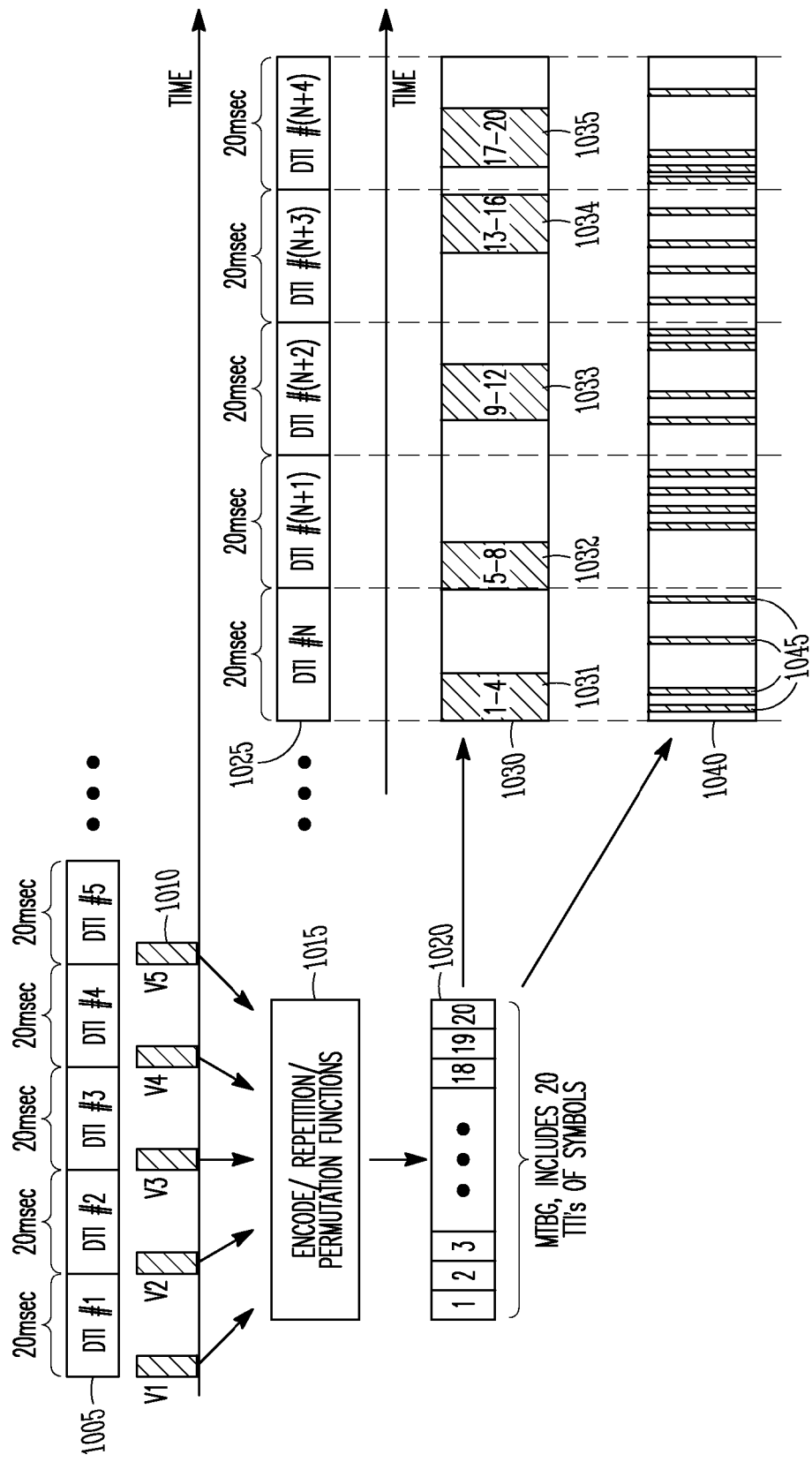
FIG. 10 illustrates an example of Voice Over IP (VoIP) communication as part of D2D communication in accordance with some embodiments.

Referring to FIG. 10, an example of VoIP transmission as part of a D2D communication session is shown. It should be noted that some or all aspects of this example may be included in other figures, techniques, and operations previously described. The D2D communication session may include transmission according to DTIs 1005 as previously described, and VoIP packets 1010 may arrive for transmission once per DTI 1005. The DTI interval shown is 20 msec in this example, but this value is not limiting, and any suitable value may be used. In addition, the interval at which VoIP packets arrive is also 20 msec in this example, but that value is not limited to 20 msec nor is it limited to be the same as the DTI interval.

The five VoIP packets 1010 labeled {V1, V2, . . . V5} may be input to the encode/repetition/permutation functions 1015, although the use of five VoIP packets 1010 is not limiting, and any suitable number of VoIP packets 1010 may be used. The encode/repetition/permutation functions 1015 may include any or all of similarly functions previously described. As an example, functions described in relation to the encode functions 612, 622, 632, 642 from FIG. 6 or encode functions 765 from FIG. 7 may be included. As another example, permutation and repetition functions used to produce the MTBGs 650, 660, or 670 from the data symbols 613, 623, 633, 645 may also used in the encode/repetition/permutation functions 1015. The output of the block 1015 may be the MTBG 1020, which includes 20 blocks of symbols for transmission in this example, labeled with the numbers 1-20 for convenience. Each of the 20 blocks may be suitable for transmission according to a TTI of one msec. As an example, the MTBG 1020 may be similar to MTBG blocks 650, 660 or 670 from FIG. 6, but may be of a different size.

As previously described, the MTBG 1020 may be transmitted during a first group of DTIs 1025, which may be labeled as N, (N+1), . . . (N+4) in this example. As an example, the MTBG 1020 may be transmitted according to the format of 1030, in which portions of the MTBG 1020 may be transmitted in each of the five DTIs 1025. As shown, blocks 1-4 may be transmitted during the time period 1031. In addition, blocks 5-8, 9-12, 13-16, and 17-20 may be transmitted during the time periods labeled 1032, 1033, 1034, and 1035. In the example, each of the time periods 1031-1035 may be part of a different DTI 1025. As shown, the time periods are not spaced uniformly in time, as the periods 1031 and 1032 are at the beginning of a DTI while the period 1034 is near the end of a DTI. This distribution in time is not limited to the arrangement shown, and may be performed according to a predetermined function.

As another example, the 20 blocks of the MTBG 1020 may be distributed throughout the DTIs 1025 according to the arrangement 1040, in which the 20 blocks after the distribution are labeled as "1045" in FIG. 10. The distribution of the blocks 1045 within the DTIs 1025 may be performed according to a predetermined pattern or pseudo-random pattern as shown in the arrangement 1040. As another example (not shown), the 20 blocks of the MTBG 1020, which may span 20 msec in duration in this example, may be transmitted in one of the DTIs 1025.

In some embodiments, the transmission of an MTBG by the UE 102 may be distributed over multiple DTIs such that a portion of the MTBG is transmitted on each of multiple DTIs. In some embodiments, data symbols of the MTBG may be divided into multiple portions, each of which may be transmitted on a different DTI. In some embodiments, some or all of the DTIs used for transmission of the MTBG may be only partially used by the UE 102 for transmission of data symbols. That is, durations of the transmissions by the UE 102 during those DTIs may occupy or span less than the entire time duration of each DTI. The transmission of the MTBG 1020 according to the arrangements 1030, 1040 may illustrate such concepts, but the embodiments are not limited to the examples of FIG. 10.

It should be noted that in the VoIP over D2D example of FIG. 10, the time axis in which the VoIP packets 1010 are received during DTIs 1005 (labeled 1-5) is extended to show a latency for the transmission of the MTBG 1020 according to possible arrangements 1030, 1040. Accordingly, the DTIs 1025 may start at a time index of N, which may be larger than 5. Presumably, the MTBG 1020 depends on the VoIP packet V5 received during DTI #5, so its formation may not be completed at least until after its reception. In some cases, there may be additional latency from functions like the encode/repetition/permutation functions 1015. As an example, the value of N may be 7, such that a 20 msec period of time is available after DTI #5 for processing the VoIP packets 1010 into the MTBG 1020. The value of 7 is not limiting, however, and any value such as 6, 8, 9, or other may be used.

A User Equipment (UE) to operate in accordance with a device-to-device (D2D) communication mode is disclosed herein. The UE may comprise hardware processing circuitry to determine a synchronization reference time based on reception of one or more signals from an Evolved Node-B (eNB). The hardware processing circuitry may be further to, during a D2D communication session, transmit Multi-Time Transmission Interval Bundle Groups (MTBG) of data symbols during a first group of Data Transmission Intervals (DTI) and refrain from transmission of data symbols during a second group of DTIs that is exclusive to the first group of DTIs. In some embodiments, starting times of the DTIs may be based at least partly on the synchronization reference time. The hardware processing circuitry may be further to transmit, during an in-network communication session exclusive to the D2D communication session, data symbols according to a Time Transmission Interval (TTI) reference time that is synchronized to the synchronization reference time.

In some embodiments, the DTIs may be of a uniform window size that spans multiple TTIs and the starting times of the DTIs may be spaced apart by an integer multiple of the window size. In some embodiments, transmission of the MTBGs during the first group of DTIs may be restricted to transmission of one or fewer MTBGs during each DTI of the first group. In some embodiments, at least some of the MTBGs transmitted in the first group of DTIs may be based at least partly on multiple Voice Over Internet Protocol (VoIP) packets. In some embodiments, the MTBGs may be transmitted as part of one or more Orthogonal Frequency Division Multiplexing (OFDM) signals and the data symbols may be mapped to Resource Elements (REs) of the OFDM signals. In some embodiments, at least some of the data symbols may be DFT pre-coded data symbols. In some embodiments, the transmission of the MTBGs may be for reception at one or more other UEs according to the synchronization reference time and the transmission of the MTBGs may occur over a direct connection with the other UEs.

The hardware processing circuitry may be further to, during the D2D communication session, receive data symbols from one or more of the other UEs during one or more of the DTIs in the second group of DTIs. The hardware processing circuitry may be further to, during an in-network communication session exclusive to the D2D communication session, transmit data symbols during a first TTI, receive data symbols during a second TTI later than the first TTI, and transmit data symbols during a third TTI later than the second TTI. In some embodiments, the first, second, and third TTIs may occur within a first DTI.

In some embodiments, the reception of the signals from the eNB may occur at least partly during an in-network communication session exclusive to the D2D communication session. The hardware processing circuitry may be further to, for at least one of the MTBGs transmitted during the D2D communication session, for each of multiple VoIP packets that include data or control bits, produce a set of data symbols for transmission according to a TTI. The hardware processing circuitry may be further to, for at least one of the MTBGs transmitted during the D2D communication session, repeat at least some of the sets of data symbols, assign to each of the sets of data symbols and the repetitions of the sets of data symbols a logical TTI time index, and arrange the sets of data symbols and the repetitions of the sets of data symbols to produce the MTBG. In some embodiments, the arrangement may be according to a predefined mapping function between the assigned logical TTI time indexes and a set of physical TTI time indexes. In some embodiments, the data symbols of the MTBG may be transmitted according to the physical TTI time indexes.

In some embodiments, producing the set of data symbols may include applying forward error correction (FEC) to the data or control bits for the VoIP packet. In some embodiments, the predefined mapping function may be for randomizing the physical TTI time indexes or for orthogonalizing the physical TTI time indexes with second, different physical TTI time indexes of one or more other UEs. In some embodiments, the transmission of at least one of the MTBGs may be distributed over multiple DTIs such that a portion of the MTBG is transmitted on each of multiple DTIs of the first group of DTIs. In some embodiments, the mapping between the logical TTI time indexes and a set of physical TTI time indexes may include scrambling the logical TTI time indexes. In some embodiments, the transmission of the MTBGs during the D2D communication session may be restricted in frequency to a D2D frequency block. In some embodiments, the D2D frequency block may include two contiguous Resource Blocks (RBs). In some embodiments, for at least one of the MTBGs transmitted during the D2D communication session, transmitting the MTBG of data symbols may include transmitting data symbols on a group of Time Transmission Intervals (TTI) according to a frequency hopping pattern of RBs.

A non-transitory computer-readable storage medium that stores instructions for execution by one or more processors to perform operations for communication in a device-to-device (D2D) mode is disclosed herein. The operations may configure the one or more processors to determine a synchronization reference time based on reception of one or more signals from an Evolved Node-B (eNB). The operations may configure the one or more processors to, during a D2D communication session, transmit Multi-Time Transmission Interval Bundle Groups (MTBG) of data symbols during a first group of Data Transmission Intervals (DTI); and refrain from transmission of data symbols during a second group of DTIs that is exclusive to the first group of DTIs. In some embodiments, starting times of the DTIs may be based at least partly on the synchronization reference time.

The operations may further configure the one or more processors to transmit, during an in-network communication session exclusive to the D2D communication session, data symbols according to a Time Transmission Interval (TTI) reference time that is synchronized to the synchronization reference time. In some embodiments, transmission of the MTBGs during the first group of DTIs may be restricted to transmission of one or fewer MTBGs during each DTI of the first group and at least some of the MTBGs transmitted in the first group of DTIs may be based at least partly on multiple Voice Over Internet Protocol (VoIP) packets. In some embodiments, the transmission of the MTBGs may be for reception at one or more other UEs according to the synchronization reference time. In some embodiments, the transmission of the MTBGs may occur over a direct connection with the other UEs. The operations may further configure the one or more processors to, during the D2D communication session, receive data symbols from one or more of the other UEs during one or more of the DTIs in the second group of DTIs.

A method of communicating in a device-to-device (D2D) mode is also disclosed herein. The method may include determining a synchronization reference time based on reception of one or more signals from an Evolved Node-B (eNB). The method may further include, during a D2D communication session, transmitting Multi-Time Transmission Interval Bundle Groups (MTBG) of data symbols during a first group of Data Transmission Intervals (DTI) and refraining from transmission of data symbols during a second group of DTIs that is exclusive to the first group of DTIs. In some embodiments, starting times of the DTIs may be based at least partly on the synchronization reference time.

The method may further include transmitting, during an in-network communication session exclusive to the D2D communication session, data symbols according to a Time Transmission Interval (TTI) reference time that is synchronized to the synchronization reference time. In some embodiments, the transmission of the MTBGs during the first group of DTIs may be restricted to transmission of one or fewer MTBGs during each DTI of the first group and at least some of the MTBGs transmitted in the first group of DTIs may be based at least partly on multiple Voice Over Internet Protocol (VoIP) packets. The method may further include receiving, during the D2D communication session, data symbols from one or more of the other UEs during one or more of the DTIs in the second group of DTIs. In some embodiments, the transmission of the MTBGs may be for reception at one or more other UEs according to the synchronization reference time and the transmission of the MTBGs may occur over a direct connection with the other UEs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A User Equipment (UE) to operate in accordance with a device-to-device (D2D) communication mode, the UE comprising hardware processing circuitry to:
    determine a synchronization reference time based on reception of one or more signals from an Evolved Node-B (eNB);
    during a D2D communication session:
        transmit Multi-Time Transmission Interval Bundle Groups (MTBGs) of data symbols during a first group of Data Transmission Intervals (DTI);
        refrain from transmission of data symbols during a second group of DTIs that is exclusive to the first group of DTIs; and
    for at least one of the MTBGs transmitted during the D2D communication session:
        for each of multiple packets that include data or control bits, produce a set of data symbols for transmission according to a Time Transmission Interval (TTI), wherein producing the set of data symbols includes applying forward error correction (FEC) to the data or control bits;
        repeat at least some of the sets of data symbols;
        assign to each of the sets of data symbols and the repetitions of the sets of data symbols a logical TTI time index; and
        arrange, according to a predefined mapping function between the assigned logical TTI time indexes and a set of physical TTI time indexes, the sets of data symbols and the repetitions of the sets of data symbols to produce the at least one of the MTBGs,
    wherein the data symbols of the at least one of the MTBGs are transmitted according to the physical TTI time indexes, and
    wherein starting times of the DTIs are based at least partly on the synchronization reference time.

2. The UE according to claim 1, wherein:
    the hardware processing circuitry is further to transmit, during an in-network communication session exclusive to the D2D communication session, data symbols according to a TTI reference time that is synchronized to the synchronization reference time; and
    the DTIs are of a uniform window size that spans multiple TTIs and the starting times of the DTIs are spaced apart by an integer multiple of the window size.

3. The UE according to claim 2, the hardware processing circuitry further to:
    during an in-network communication session exclusive to the D2D communication session:
        transmit data symbols during a first TTI;
        receive data symbols during a second TTI later than the first TTI;
        transmit data symbols during a third TTI later than the second TTI;
        wherein the first, second, and third TTIs occur within a first DTI.

4. The UE according to claim 1, wherein:
    transmission of the MTBGs during the first group of DTIs is restricted to transmission of one or fewer MTBGs during each DTI of the first group; and
    at least some of the MTBGs transmitted in the first group of DTIs are based at least partly on multiple Voice Over Internet Protocol (VoIP) packets.

5. The UE according to claim 1, wherein the MTBGs are transmitted as part of one or more Orthogonal Frequency Division Multiplexing (OFDM) signals and the data symbols are mapped to Resource Elements (REs) of the OFDM signals.

6. The UE according to claim 5, wherein at least some of the data symbols are discrete Fourier transform (DFT) pre-coded data symbols.

7. The UE according to claim 1, wherein:
    the transmission of the MTBGs is for reception at one or more other UEs according to the synchronization reference time; and
    the transmission of the MTBGs occurs over a direct connection with the other UEs.

8. The UE according to claim 7, the hardware processing circuitry further to, during the D2D communication session, receive data symbols from one or more of the other UEs during one or more of the DTIs in the second group of DTIs.

9. The UE according to claim 1, wherein the reception of the signals from the eNB occurs at least partly during an in-network communication session exclusive to the D2D communication session.

10. The UE according to claim 1, wherein the predefined mapping function is for randomizing the physical TTI time indexes or for orthogonalizing the physical TTI time indexes with second, different physical TTI time indexes of one or more other UEs.

11. The UE according to claim 1, wherein the transmission of at least one of the MTBGs is distributed over multiple DTIs such that a portion of the MTBG is transmitted on each of multiple DTIs of the first group of DTIs.

12. The UE according to claim 1, wherein the transmission of the MTBGs during the D2D communication session is restricted in frequency to a D2D frequency block.

13. The UE according to claim 1, wherein for at least one of the MTBGs transmitted during the D2D communication session, transmitting the MTBG of data symbols includes transmitting data symbols on a group of TTIs according to a frequency hopping pattern of Resource Blocks (RB).

14. A non-transitory computer-readable storage medium that stores instructions for execution by one or more processors to perform operations for communication in a device-to-device (D2D) mode, the operations to configure the one or more processors to:
   determine a synchronization reference time based on reception of one or more signals from an Evolved Node-B (eNB);
   during a D2D communication session:
      transmit Multi-Time Transmission Interval Bundle Groups (MTBGs) of data symbols during a first group of Data Transmission Intervals (DTI);
      refrain from transmission of data symbols during a second group of DTIs that is exclusive to the first group of DTs; and
      for at least one of the MTBGs transmitted during the D2D communication session:
         for each of multiple packets that include data or control bits, produce a set of data symbols for transmission according to a Time Transmission Interval (TTI);
         repeat at least some of the sets of data symbols:
         assign to each of the sets of data symbols and the repetitions of the sets of data symbols a logical TTI time index; and
         arrange, according to a predefined mapping function between the assigned logical TTI time indexes and a set of physical TTI time indexes, the sets of data symbols and the repetitions of the sets of data symbols to produce the at least one of the MTBGs,
         wherein the data symbols of the at least one of the MTBGs are transmitted according to the physical TTI time indexes, and
         wherein starting times of the DTIs are based at least partly on the synchronization reference time.

15. The non-transitory computer-readable storage medium according to claim 14, the operations to further configure the one or more processors to transmit, during an in-network communication session exclusive to the D2D communication session, data symbols according to a TTI reference time that is synchronized to the synchronization reference time.

16. The non-transitory computer-readable storage medium according to claim 15, wherein:
   transmission of the MTBGs during the first group of DTIs is restricted to transmission of one or fewer MTBGs during each DTI of the first group; and
   at least some of the MTBGs transmitted in the first group of DTIs are based at least partly on multiple Voice Over Internet Protocol (VoIP) packets.

17. The non-transitory computer-readable storage medium according to claim 14, wherein:
   the transmission of the MTBGs is for reception at one or more other UEs according to the synchronization reference time;
   the transmission of the MTBGs occurs over a direct connection with the other UEs; and
   the operations further configure the one or more processors to, during the D2D communication session, receive data symbols from one or more of the other UEs during one or more of the DTIs in the second group of DTIs.

18. A method of communicating in a device-to-device (D2D) mode, the method comprising:
   determining a synchronization reference time based on reception of one or more signals from an Evolved Node-B (eNB);
   during a D2D communication session:
      transmitting Multi-Time Transmission Interval Bundle Groups (MTBG) of data symbols during a first group of Data Transmission Intervals (DTI);
      refraining from transmission of data symbols during a second group of DTIs that is exclusive to the first group of DTIs; and
   for at least one of the MTBGs transmitted during the D2D communication session:
      for each of multiple packets that include data or control bits, produce a set of data symbols for transmission according to a Time Transmission Interval (TTI);
      repeat at least some of the sets of data symbols;
      assign to each of the sets of data symbols and the repetitions of the sets of data symbols a logical TTI time index; and
      arrange, according to a predefined mapping function between the assigned logical TTI time indexes and a set of physical TTI time indexes, the sets of data symbols and the repetitions of the sets of data symbols to produce the at least one of the MTBGs,
      wherein the data symbols of the at least one of the MTBGs are transmitted according to the physical TTI time indexes, and
      wherein starting times of the DTIs are based at least partly on the synchronization reference time.

19. The method according to claim 18, further comprising transmitting, during an in-network communication session exclusive to the D2D communication session, data symbols according to a TTI reference time that is synchronized to the synchronization reference time.

20. The method according to claim 19, wherein:
   the transmission of the MTBGs during the first group of DTIs is restricted to transmission of one or fewer MTBGs during each DTI of the first group; and
   at least some of the MTBGs transmitted in the first group of DTIs are based at least partly on multiple Voice Over Internet Protocol (VoIP) packets.

21. The method according to claim 18, the method further comprising receiving, during the D2D communication session, data symbols from one or more of the other UEs during one or more of the DTIs in the second group of DTIs;
   wherein the transmission of the MTBGs is for reception at one or more other UEs according to the synchronization reference time; and
   wherein the transmission of the MTBGs occurs over a direct connection with the other UEs.

* * * * *

UNITED STATES PATENT AND TRADEMARK OFFICE
CERTIFICATE OF CORRECTION

PATENT NO. : 9,491,725 B2  
APPLICATION NO. : 14/493030  
DATED : November 8, 2016  
INVENTOR(S) : Khoryaev et al.

Page 1 of 1

It is certified that error appears in the above-identified patent and that said Letters Patent is hereby corrected as shown below:

In the Claims

In Column 19, Line 27, in Claim 14, delete "DTs;" and insert --DTIs;--, therefor In Column 19, Line 33, in Claim 14, delete "symbols:" and insert --symbols;--, therefor Signed and Sealed this
Twenty-seventh Day of March, 2018

Andrei Iancu
*Director of the United States Patent and Trademark Office*